United States Patent [19]

Hietaranta

[11] Patent Number: 4,757,708
[45] Date of Patent: Jul. 19, 1988

[54] THROUGH HOLE CONSTRUCTION FOR PROCESS MEASURING DEVICES

[75] Inventor: Matti Hietaranta, Nattari, Finland

[73] Assignee: Valmet OY, Tampere, Finland

[21] Appl. No.: 26,505

[22] Filed: Mar. 17, 1987

[30] Foreign Application Priority Data

Mar. 18, 1986 [FI] Finland ............................. 861117

[51] Int. Cl.$^4$ ............................................. G01N 11/10
[52] U.S. Cl. ............................................. 73/59; 73/54
[58] Field of Search ................ 73/59, 54, 63, 60; 277/212 R, 212 FB, 63

[56] References Cited

U.S. PATENT DOCUMENTS

| 2,683,984 | 7/1954 | Boyle et al. | 73/59 |
| 3,424,011 | 1/1969 | Pontis | 74/18.1 |
| 4,062,226 | 12/1977 | Hietala | 73/63 |
| 4,148,215 | 4/1979 | Hofstetter, Jr. | 73/59 |
| 4,229,010 | 10/1980 | St. Laurent, Jr. | 277/30 |
| 4,312,217 | 1/1982 | Hartert | 73/59 |
| 4,435,680 | 3/1984 | Froncisz et al. | 324/316 |
| 4,453,147 | 6/1984 | Froncisz et al. | 324/316 |
| 4,480,239 | 10/1984 | Hyde et al. | 324/315 |
| 4,504,788 | 3/1985 | Froncisz et al. | 324/316 |
| 4,522,414 | 6/1985 | Schulte | 277/212 R |
| 4,593,248 | 6/1986 | Hyde et al. | 324/317 |
| 4,623,835 | 11/1986 | Mehdizadeh et al. | 324/316 |
| 4,633,180 | 12/1986 | Biehl et al. | 324/316 |

FOREIGN PATENT DOCUMENTS

| 3204817 | 8/1983 | Fed. Rep. of Germany. | |
| 33814 | 10/1964 | Finland | 73/54 |
| 41216 | 6/1969 | Finland | 73/59 |
| 1133501 | 1/1985 | U.S.S.R. | 73/54 |

Primary Examiner—Stewart J. Levy
Assistant Examiner—Hezron E. Williams
Attorney, Agent, or Firm—Pollock, Vande Sande & Priddy

[57] ABSTRACT

The measuring device (2) comprises a sensing element (4) communicating with the process substance as well as a lever-like transfer element (7) connected with the sensing element and arranged to transfer the force acting on the sensing element and generated by the process substance to be measured to a measuring element (6) using the torque applied to the transfer element (7) about its fulcrum. The through hole (8) has a diaphragm (14) of elastic material covering the hole, being in engagement with the transfer member (7) in the position substantially perpendicular to the longitudinal axis thereof and acting as a sealing member separating the portion outside the process substance from the process substance. The diaphragm is mounted between two elastic gaskets (16) located in the side region of the through hole (8) in order to allow the free movement of the diaphragm in the direction of its main plane for eliminating tension forces applied to the diaphragm by the translation and the rotation of the transfer element (7) and causing measurement inaccuracy.

15 Claims, 5 Drawing Sheets

THROUGH HOLE CONSTRUCTION FOR PROCESS MEASURING DEVICES

BACKGROUND OF THE INVENTION

The present invention relates to a through hole construction for process measuring devices transferring force or movement from the measuring element communicating with the process substance to a measuring mechanism outside the process substance.

Such measuring devices are in wide use in the measuring operations applied in various processes. For carrying out the measuring operation, the measuring devices are provided with a sensing element in communication with the process substance and effected by a force resulting from the process substance to be measured. The device is also provided with a lever-like transfer element connected with the sensing element and transferring the force acting on the sensing element using the torque about the transverse axis of the transfer element to a member performing the actual measuring operation and being located outside the process substance. The transfer member is led from the portion communicating with the process substance to the portion outside the process substance through a through hole. The through hole must in this case have a sealing member for separating the portion outside the process substance and at the same time the measuring mechanism from the process substance. Because the purpose is to measure the force, the construction at the through hole must be as elastic as possible in order to minimize the forces acting on the transfer member and resulting from the construction of the through hole. It is also not allowable, that other factors than those caused by the process substance to be measured effect the measuring results.

The present invention relates more particularly to a through hole construction in devices measuring the consistency, for example the percentage of solids in the mixture, of flowing solid-liquid-mixtures, e.g. paper stock and being of the type disclosed in U.S. Pat. No. 4,062,226. One of the requirements for devices of this type is that the resistance to torque about the transverse axis of the transfer element must be directly proportional to the actual torque applied by the sensing element to the transfer element. This kind of resistance or "counter-torque" results from the structure of the sealing member in the through hole. Due to the considerable friction and hysteresis caused by the internal friction or plasticity characteristic of elastomers used in the through hole construction, the above mentioned requirements are not sufficiently met.

In well-known measuring devices of the above type the leading-through of the transfer element is realized by disposing an elastic rubber seal, such as a O-ring, around the transfer member to lie against the side surfaces of the through hole. The leading-through is also realized by a bellows tube of metal fixed between the transfer element and the side of the hole. The above mentioned constructions are insufficient as far as the elasticity of the seal is concerned. When a rubber seal is used, the hysteresis error is a considerable drawback and, moreover, this error will change during the lifetime of the seal. Further, the changes in the stiffness of the rubber during the life-time give rise to errors in the measurement. The elasticity of the rubber may also be temperature-dependent, and as a result of this in some cases the rubber seal must be heated for maintaining its temperature in a certain range. The adjustment of the measuring device to be independent of the changes of static pressure is also difficult. The drawback of the leading-through using the bellows tube is the possible clogging of the tube, which results in the stiffening of the through hole construction. This construction has further a considerable torsion stiffness, which causes extra tensions at the leading-through, thus making the measurement difficult.

SUMMARY OF THE INVENTION

The object of the present invention is to eliminate all the above mentioned drawbacks, which are caused by the constructions presented by the state of the art. For achieving this purpose the through hole construction according to the present invention includes a diaphragm of elastic material in the through hole, for which the requirements of elasticity can be met in most suitable way. For receiving the force caused by the pressure of process as well as the peak forces caused by the lumps such as pulp lumps which may be present in the process substance, the diaphragm is well supported by the support means of the lever-like transfer member. The support means can for example constitute of bearings. Due to the elasticity of the diaphragm, no greater tensions are present in the diaphragm for example in the case of peak load directed on the diaphragm. By allowing the relative movement of the diaphragm and the region of engagement with respect to each other in the direction of the main plane of the diaphragm at least in one of the regions of engagement, the elasticity of the construction of the through hole can be increased and at the same time the rupture of the diaphragm due to peak load forces and the measurement error due to the diaphragm tensions caused by the clearance of the bearings are avoided. The tensions in the diaphragm, which develop during the assembly and securing of the parts can also be eliminated with this arrangement. The present through hole structure invention facilitates also the adjustment of the static pressure.

The various embodiments present advantageous ways of fixing the diaphragm as well as constructional alternatives. The diaphragm can be mounted in its region of engagement into connection with an elastic gasket, for example between gaskets, which can be selected from various suitable materials. Moreover, there are several possibilities concerning the material and the shape of the diaphragm.

In the following, the invention is described in more detail with reference to one preferred embodiment thereof, wherein the invention is applied in a measuring device measuring the consistency of paper stock or corresponding mixtures. In the description, references are also made to the accompanying drawings, wherein

DETAILED DESCRIPTION OF THE PREFERRED EMBODIMENT

Figure 1:
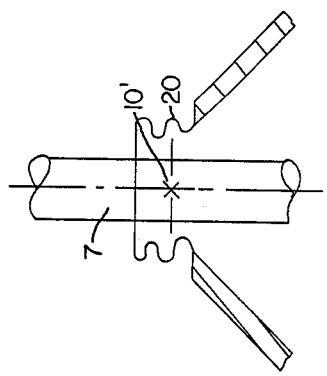
FIGS. 1 and 2 show through hole constructions according to the prior art.

FIG. 1 shows a through hole construction of prior art, wherein the through hole is sealed by means of O-ring packing 19 disposed between the lever-like transfer rod 7 and the side wall of the opening. The transfer rod is supported by the bearings in the body of the measuring device and the position of the bearings is denoted by the common axis 10' of the bearings, which axis extends perpendicularly to the plane of the drawing.

Figure 2:
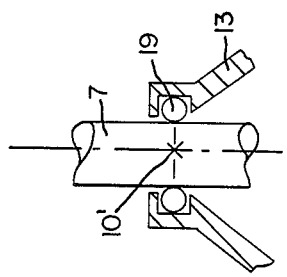

FIG. 2 shows another embodiment belonging to the state of the art, wherein a bellows tube 20 made of metal is fixed onto the transfer rod 7 and on the side wall of the hole and acts as the sealing member.

Figure 3:
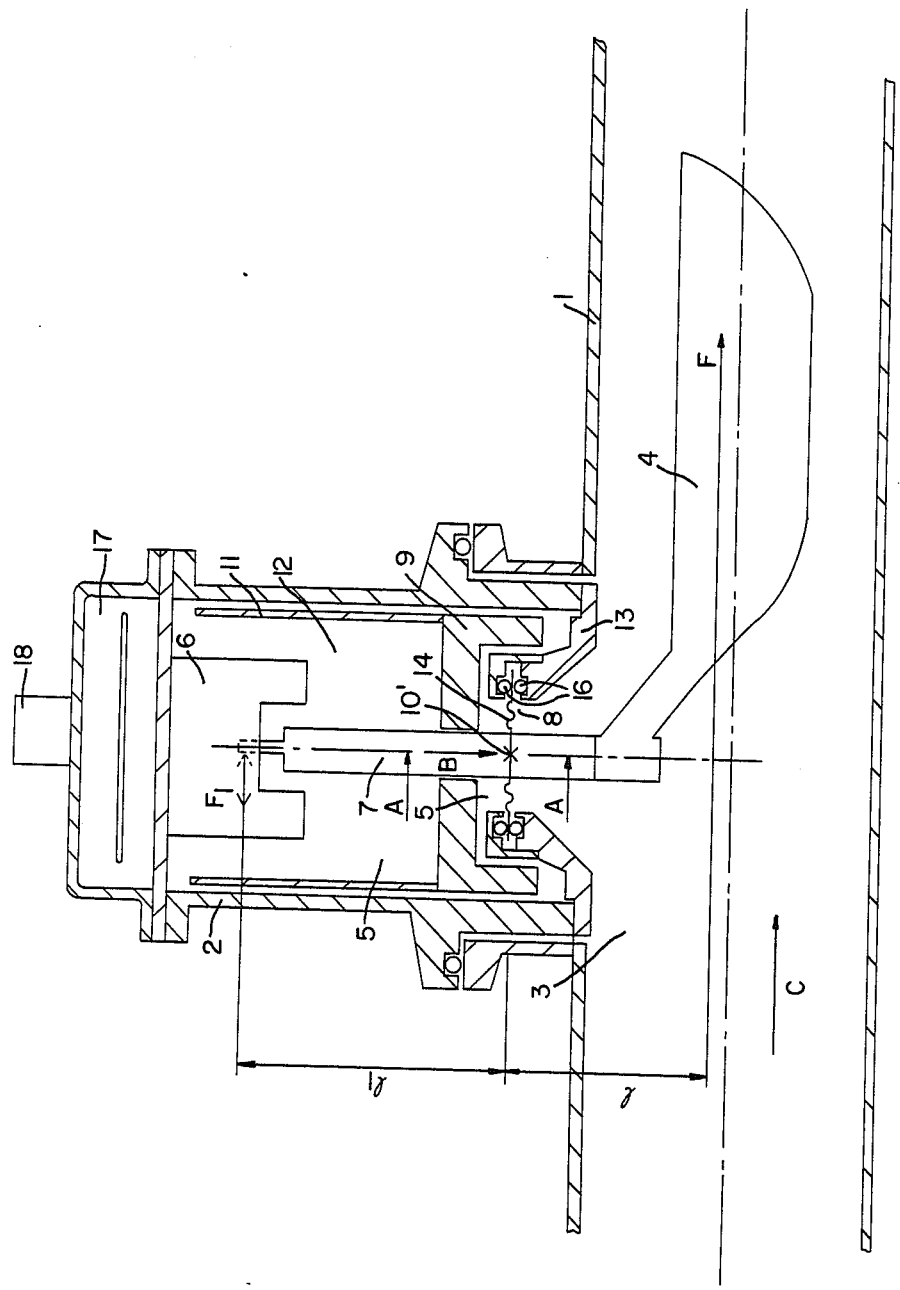
FIG. 3 shows a sectional view of the measuring device incorporating the through hole construction according to the present invention.

FIG. 3 shows a measuring device 2 for measuring the consistency of paper stock flow. The device is illustrated in a sectional view, the section being taken along the plane parallel to the process pipe 1, on which the device is installed. The measuring device comprises a sensing element 4 in contact with the paper stock 3 flowing in the process pipe (the direction of the flow is denoted by arrow C). The sensing element consists of an elongated blade having the configuration of a paddle, to which shearing force is applied due to the flowing paper stock. The force is dependent on the consistency of the paper stock and is denoted in the figure by letter F. The measuring device comprises further the portion 5 outside the process substance incorporating the measuring mechanism 6 for measuring the force acting on the sensing element. The force is transferred to the measuring mechanism by means of a lever-like transfer rod 7 using the torque about its transverse axis (arms l and l' and force $F_1$). The transfer rod is attached at its one end to the sensing element and at its other end it communicates with the measuring mechanism. The transfer rod is led from the process substance to the portion of the measuring device outside the process substance via a through hole 8 and it is pivotally mounted to the body by means of a bushing 9. The bushing 9 is pivotally fixed to the body of the measuring device by means of ball bearings 10 (not shown in the Figures). The common axis of the bearings is denoted in FIG. 1 by reference numeral 10' and it passes the through hole via the transfer rod thus defining the transverse axis extending perpendicularly to the flow of the paper stock and creating the fulcrum, on the basis of which the measurement is realized using the above described torque. The portion of the measuring device outside the process substance comprises further a damping cylinder 11 fixed onto the bushing 9. The damping cylinder 11 is surrounded by damping oil 12 for eliminating disturbances caused by various oscillations. The measuring device comprises further the electronics unit 17 and the connection plug 18. The output signal proportional to the force F to be measured is obtained by measuring mechanism 6 an the electronics unit 17 using methods well-known in the art and therefore they will not be described in more detail.

For forming the through hole construction of the measuring device, a bushing 13 having the shape of a frustum of a cone is attached to the body of the measuring device. The aperture at the smaller diameter end of the bushing forms the through hole 8. For separating the device portion 5 outside the process substance from the process substance 3, the through hole contains an elastic diaphragm 14, which is preferably of metal and corrugated to a wave-like configuration. The diaphragm is attached to the transfer rod 7, its main plane directed perpendicularly to the longitudinal axis thereof. The main plane of the diaphragm coincides with the axis 10' of the bearings. The diaphragm covers the hole 8 and acts in this way as a sealing member preventing the process substance from penetrating into the device portion 5, which is situated outside the process substance.

Figure 4:
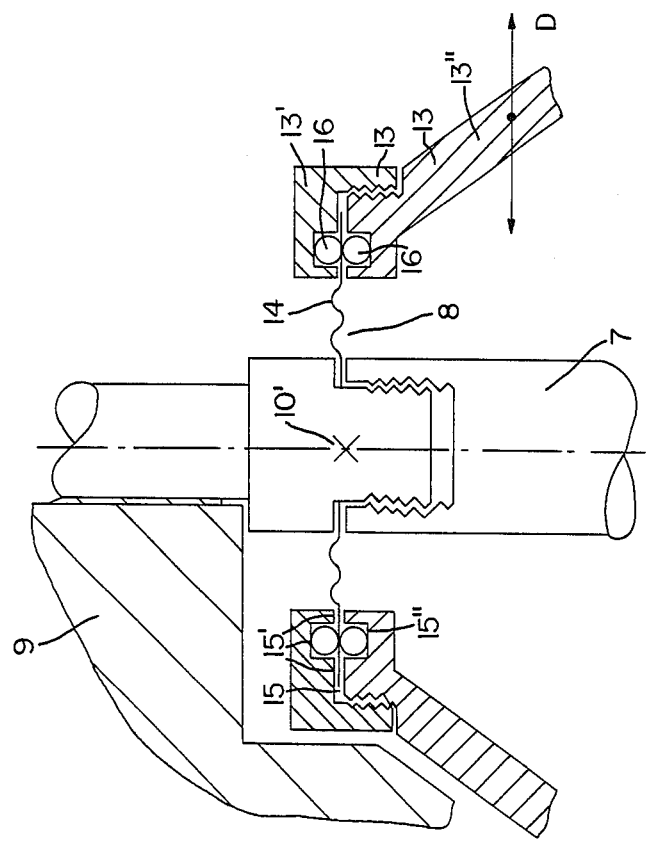
FIG. 4 shows the through hole construction in a sectional view similar to that of FIG. 3.
Figure 5:
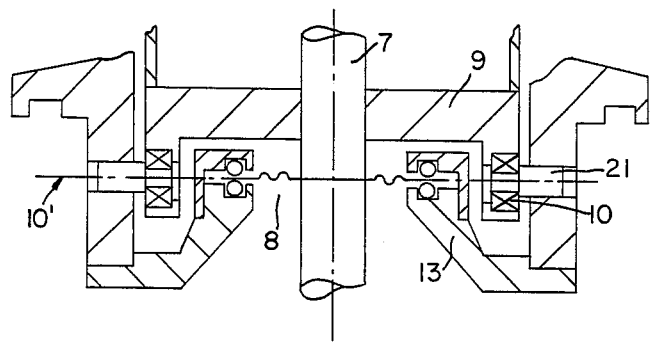
FIG. 5 shows the through hole construction as a sectional view seen in the direction of arrow A in FIG. 3.

FIG. 4 shows the through hole construction of FIG. 3 in a greater scale and FIG. 5 shows the construction of the through hole and the pivotal arrangement of the transfer rod in a sectional view taken along a plane perpendicular to the process pipe 1 and seen in the direction of arrows A of FIG. 3. The bushing 9 fixed onto the transfer rod 7 is fixed to the body of the measuring device by means of ball bearings 10 and a bearing pivot 21. The diaphragm 14 is attached at its outer periphery into a peripheral recess 15 situated in the main plane of the diaphragm and extending along the side wall of the through hole 8 so, that the motion of the diaphragm 14 in the direction of its main plane is possible. The depth of the recess in the direction perpendicular to the longitudinal axis of the transfer rod 7 is dimensioned to allow the slight lateral movement of the edge of the diaphragm. In the construction shown in the figures the gaskets 16 having the shape of a O-ring seal are disposed in the recess on the both sides of the diaphragm. The seal rings lie tightly against the diaphragm influenced by the pressure from the side walls 15' of the recess. As illustrated in FIG. 4, a guide groove 15'' is provided in each side wall 15' of the recess 15 for fitting the seal ring securely against the side wall of the recess. The O-ring seals are made of elastic material, such as rubber, which contributes to a good sealing effect, but has frictional properties allowing at the same time the diaphragm to be shifted on sliding between the gaskets.

Figure 7A:
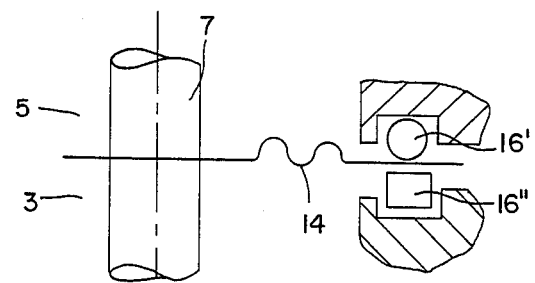
Figure 7B:
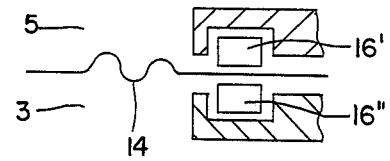

FIG. 7 shows another alternative for mounting the diaphragm movably in the direction of its main plane. An equally advantageous result is obtained, compared with two elastic gaskets, when the gasket 16' at the side of the portion 5 outside the process substance is elastic and the gasket 16'' at the side of the process substance 3 is a non-elastic gasket of chemically resistant material. The material of the latter can be for example polytetrafluorethylene (PTFE), known also by its trade name TEFLON ®, or the material can be also metal. A similar result is obtained by changing the locations of the gaskets. The gasket at the side of the process substance is in this case made of an elastic, chemically resistant material, such as of a suitable rubber material, and at the opposite side of the diaphragm there is non-elastic gasket. As illustrated in FIG. 7, the cross-section ot the ring-like gasket does not necessarily have to be round, but it can have also a rectangular shape.

The relative movement between the diaphragm and its region of engagement in the direction of the main plane of the diaphragm is arranged in the embodiments described above by mounting the diaphragm rigidly on the transfer rod and at the region adjacent to its outer periphery it is mounted movably on the side wall of the through hole. However, the through hole construction can also be realized so, that the diaphragm is mounted rigidly on the side wall of the through hole and the mounting of the diaphragm onto the transfer rod is realized following the same principle as is applied in the mounting of the diaphragm on the side wall of the hole and is described in the foregoing examples, i.e. the diaphragm containing an opening in its central portion for leading the transfer rod through it, is disposed between gaskets provided in the transfer rod. The transfer rod can in this case move freely with respect to the diaphragm when necessary. The region of engagement with the diaphragm allowing the above described possibility for movement can thus be located in the transfer rod 7 or in the side wall of the through hole 8 and the practical applications presented hereinabove can be used in both cases.

The movements of the diaphragm and the region of engagement with respect to each other can be arranged at the region of engagement by fixing the elastic gasket onto the diaphragm itself, for example to surround the edge of the diaphragm, and the region of engagement is provided with a recess of sufficient depth allowing the movement of the gasket and the diaphragm attached thereto relative to the region of engagement. The gasket can be attached to the diaphragm in many ways such as by vulcanizing, gluing, etc.

The through hole construction described hereinabove has various important advantages compared with the constructions known in prior art. Compared with a rubber seal surrounding the transfer rod, the elasticity of the diaphragm remains always the same, for example hysteresis is infinitesimal and there is no temperature-dependency. Due to the clearance always present in the bearings, the transfer rod shows a certain degree of translation and rotation causing lateral forces between the transfer rod and the sealing member covering the through hole. As the diaphragm is able to move together with the transfer rod in the hole or, analogously, as the transfer rod is able to move relative to the diaphragm, such forces causing inaccuracies in the measurement are avoided. The through hole according to the present invention has also excellent properties of flexibility when subjected to peak load forces.

The diaphragm and the seals lying against it can easily be installed to their places in the through hole between a ring-like member 13' forming the smaller diameter end in the bushing 13 of the shape of a frustum of a cone and between the body 13" forming the actual main portion of the bushing. The ring member 13' can be rotated to its place by means of threads provided in the body 13" and the member 13'. These two elements are dimensioned so that, when joined together, the recess 15 for the outer edge of the diaphragm and the seals remain therebetween. When it is desirable to arrange the seals in connection with the transfer rod, the installation can be carried out in an analogous way, in which case the transfer rod is constituted of two portions joined together by means of threads at the height of the through hole and these portions are shaped at the joining region in such a way, that the recess for the seals and the diaphragm remains at the joining point. Due to the construction of the through hole the diaphragm will be free of tensions, which normally exist in the diaphragm during the installation and which could cause errors in the measurement results.

The cross-section of the recess 15 at the point of fixation of the diaphragm 14 can be dimensioned and shaped in various alternative ways. The most important functional feature is the good sealing effect and the possibility of the relative movement between the diaphragm and the region of engagement in the direction of the main plane of the diaphragm. The cross-section of the recess can have for example a shape of a semicircle. The seals are retained by the suitably shaped walls of the recess, but it is also possible to secure the seals by gluing.

The diaphragm shown in the Figures is corrugated into a wave-like configuration at its portions overlapping the free passage area of the hole. The convolutions extend parallel with the cocentric circles, whose common mid-point coincides with the longitudinal axis of the transfer rod. These convolutions have been formed in order to minimize the resistance to tilting of the transfer rod, and the most advantageous effect is obtained when the convolutions follow the configuration of a sine-wave. However, in some ranges of measurement, even a planr diaphragm can be used.

Figure 6:
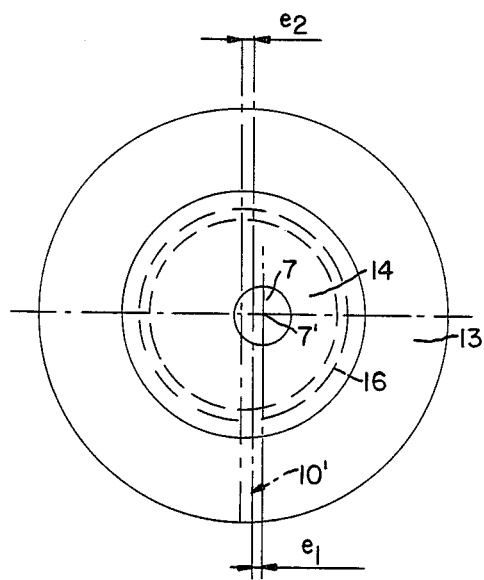
FIG. 6 shows the through hole construction seen in the direction of arrow B in FIG. 3, and FIG. 7a and 7b show various alternatives for engagement of the through hole diaphragm with the structure of the device.

FIG. 6 shows the through hole construction in a sectional view taken perpendicularly to the longitudinal axis of the transfer rod 7 at the height of the through hole 8, seen in the direction of arrow B in FIG. 3. Due to slight inaccuracies in the manufacture, the mid-point 7' of the transfer rod 7 can be shifted laterally relative to the axis 10' of the bearings. This distance is denoted by letter $e_1$ in FIG. 6. For eliminating this, the cone-like bushing 13 can be arranged to be movable with respect to the axis 10' of bearings. Due to the construction of the through hole, the position of the hole area covered by the diaphragm 14 can be easily adjusted with respect to the axis 10'. This is done by moving the cone-like bushing 13 with respect to the axis 10'. The hole area covered by the diaphragm can thus be adjusted to lie in the position, where the changes of the static pressure of the process substance do not cause errors in the measurement results. This adjustment is shown schematically also in FIG. 4 by arrow D. This possibility of adjustment is realized in practice most suitably so, that the cone-like bushing 13 and the recesses for the gaskets are located excentrically of the axis 10' (distance $e_2$ in FIG. 6), in which case the adjustment can be done by rotating the cone-like bushing 13, which for this purpose is arranged to a rotatable connection with the body of the measuring device at its larger diameter end.

It will be understood, that the present invention is not described above in order to refer only to one preferred embodiment thereof, but it can be modified within the scope represented by the accompanying claims, wherein the inventive idea is disclosed. All materials having the suitable properties required by the practical application and the process substance can be applied as a manufacture material of the seals and the diaphragms. The choice can be done from materials in common use in the instrumentation using the knowledge of a man skilled in the art and taking into consideration the circumstances, where they are to be applied. At the side of the process substance, the gasket must be of a chemically resistant material, such as a chemically resistant rubber, PTFE or metal. The diaphragm must be made of elastic material and for this purpose diaphragms made of acid and corrossion resistant metal, such as titanium, are applicable. Also chemically resistant plastic diaphragms can be used and these materials are well known in process instrumentation.

The present invention can be applied in the transmitter measuring the consistency, for example the percentage of fibres in the water, of paper stock and similar pulp mixtures. The transmitter uses the above described measuring principle and is manufactured by the applicant under the trade name PULP-EL. The application range of the invention is, however, not restricted to only measuring devices measuring the consistency of the process substance, but it can be also applied in all measuring devices, in which the force and/or the movement is transferred from the process substance to a portion of the measuring device located outside the process substance. As an example of these kinds of devices can be mentioned different liquid level detectors. The present invention is especially suitable for those measurements, wherein a high accuracy is needed and all factors causing errors must be eliminated or at least minimized.

I claim:

1. A through hole construction in a measuring device (2) which includes a sensing element (4) communicating with a process substance (3) and being subject to a force generated by the process substance, and a device portion (5) outside the process substance, said portion being bounded by a boundary surface of the process substance, a lever-like transfer element (7) connected with the sensing element (4) and led from the process substance to the portion (5) outside the process substance via a through hole (8) located at the boundary surface of the process substance and having a side region consisting of an area around the cavity of said hole, the transfer element being supported by the measuring device by fixing means, such as bearings (1), creating a fulcrum for said transfer element and arranged to transfer the force acting on the sensing element due to the process substance, to a measuring element (6) in the portion outside the process substance using the torque applied by the sending element (4) to the transfer element (7) about the fulcrum defined by said fixing means, said through hole (8) comprising a sealing member for separating the portion outside the process substance from the process substance, said sealing member being a diaphragm (14) of elastic material in an engagement with said transfer element (7) and covering said through hole in a position substantially perpendicular to the longitudinal axis of the transfer element and being in engagement with the measuring device at two regions, the first region engagement with the measuring device being the side region of the through hole at the outer periphery of the diaphragm and the second region of engagement with the measuring device being the transfer element located at the central portion of the diaphragm, at least one of the said regions of engagement allowing the diaphragm and the region of engagement to move relative to each other substantially in the direction of the main plane of the diaphragm in order to eliminate the forces causing measurement inaccuracy, such as tension forces applied to the diaphragm by translation and rotation of the transfer element relative to said through hole.

2. A through hole construction as claimed in claim 1 wherein said diaphragm is rigidly attached at its cental portion to the transfer element (7) and mounted movably at its outer periphery to the side region of said through hole (8) in order to allow free movement of said diaphragm relative to the through hole in the main plane of said diaphragm during the translation and rotation of the transfer member.

3. A through hole construction as claimed in claim 1 wherein said diaphragm (14) is rigidly attached at its outer periphery to the side region of the through hole (8) and mounted at its central portion to the transfer member (7) in such a way that the transfer member can move freely relative to said diaphragm in the direction of the main plane of the diaphragm during the translation and rotation of the transfer member.

4. A through hole construction as claimed in claim 1 wherein in the region of engagement allowing said relative movement, the diaphragm (14) is mounted into connection with an elastic gasket (16).

5. A through hole construction as claimed in claim 4 wherein said elastic gasket (16) is fixed on said diaphragm (14) and said gasket and the region of engagement are arranged to move relative to each other.

6. A through hole construction as claimed in claim 4 wherein said diaphragm (14) is mounted to lie against a separate elastic gasket (16) located in the region of engagement allowing said relative movement.

7. A through hole construction as claimed in claim 6 wherein said elastic gasket (16) lies against the surface of the diaphragm (14) on the side thereof facing the portion (5) outside the process substance ; whereas, lying against the surface of the diaphragm facing the process substance (3) there is a non-elastic gasket made of polytetrafluorethylene.

8. A through hole construction as claimed in claim 6 wherein said elastic gasket (16) lies against the surface of the diaphragm (14) facing the process substance (3) and lying against the surface of the diaphragm facing the portion (5) outside the process substance, is a non-elastic gasket made of polytetrafluorethylene.

9. A through hole construction as claimed in claim 6 wherein said diaphragm (14) is mounted between two elastic gaskets (16) disposed in the region of engagement allowing said relative movement.

10. A through hole construction as claimed in claim 9 wherein said gaskets (16) are constituted of O-rings mounted into a recess (15) along the side wall of the through hole (8) and arranged to be pressed against the surfaces of the diaphragm (14) at the opposite sides thereof due to pressure caused by the walls (15') of the recess.

11. A through hole construction as claimed in claim 6 wherein said diaphragm is a planar metal diaphragm.

12. A through hole construction as claimed in claim 1 wherein said diaphragm is a metal diaphragm, which is shaped to have convolutions creating a wavelike cross-section the convolutions of the wavelike configuration being parallel to concentric circles, whose mid-point coincides with the longitudinal axis of the transfer element.

13. A through hole construction as claimed in claim 6 wherein said elastic gasket (16) lies against the surface of the diaphragm (14) on the side thereof facing the portion (5) outside the process substance; whereas, lying against the surface of the diaphragm facing the process substance (3) is a non-elastic gasket made of metal.

14. A through hole construction as claimed in claim 6 wherein said elastic gasket (16) lies against the surface of the diaphragm (14) facing the process substance (3) and lying against the surface of the diaphragm facing the portion (5) outside the process substance, is a non-elastic gasket made of metal.

15. A through hole construction as claimed in claim 12 wherein said convolutions create a sine-wave type cross-section.

* * * * *